United States Patent
Muramatsu et al.

(10) Patent No.: US 10,548,192 B2
(45) Date of Patent: Jan. 28, 2020

(54) LIGHT-EMITTING ELEMENT DRIVING DEVICE, SEMICONDUCTOR DEVICE, LIGHT-EMITTING DEVICE, AND LIQUID CRYSTAL DISPLAY DEVICE

(71) Applicant: Rohm Co., Ltd., Kyoto (JP)

(72) Inventors: Yasunori Muramatsu, Kyoto (JP); Tetsuo Tateishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 16/121,757

(22) Filed: Sep. 5, 2018

(65) Prior Publication Data

US 2019/0090322 A1    Mar. 21, 2019

(30) Foreign Application Priority Data

Sep. 7, 2017  (JP) .................. 2017-172231

(51) Int. Cl.
*H05B 33/00*  (2006.01)
*H05B 33/08*  (2006.01)
*G02F 1/13357* (2006.01)

(52) U.S. Cl.
CPC ....... *H05B 33/0827* (2013.01); *G02F 1/1336* (2013.01); *H05B 33/0845* (2013.01)

(58) Field of Classification Search
CPC ........... H05B 33/0815; H05B 33/0818; H05B 33/0851; H05B 33/0845; H05B 39/04; H05B 39/044; H05B 33/0803; H05B 33/0821; H05B 33/083; H05B 33/0857; H05B 37/02; H05B 33/0827; H05B 33/0809; H05B 33/0824; H05B 33/0863; H05B 33/0869; H05B 33/0887; H05B 33/089; H05B 37/0263; H05B 37/029; H05B 41/282; H05B 33/0812; H05B 33/0842; H05B 33/0848; H05B 37/0218; H05B 37/0227; H05B 39/045; H05B 41/2888; H05B 41/2923; H02M 3/158; H02M 3/335; H02M 3/07; H02M 3/33592; H02M 1/4241; H02M 1/42; H02M 3/1584; H02M 3/33507; H02M 1/4258; H02M 2001/0058; H02M 2001/007; H02M 2001/0074; H02M 2001/0077; H02M 3/285; H02M 1/08; H02M 1/36; H02M 2001/0009; H02M 2001/0032; H02M 7/217; H02M 1/10; H02M 3/156; H02M 3/337; H02M 3/3374; H02M 1/4208; H02M 2001/0006; H02M 2001/0025; H02M 3/157; H02M 2001/009; H02M 3/33523; H02M 7/48; H02M 1/34;

(Continued)

(56) References Cited

FOREIGN PATENT DOCUMENTS

JP    2009-188135    8/2009

*Primary Examiner* — Monica C King
(74) *Attorney, Agent, or Firm* — Fish & Richardson P.C.

(57) ABSTRACT

An LED driver includes a constant current circuit for supplying a constant current to a light-emitting portion composed of LEDs, a main transistor inserted serially between the light-emitting portion and the constant current circuit, a sub transistor connected to the node between the constant current circuit and the main transistor, and a control circuit. The LED driver drives the main transistor with pulses to make the light-emitting portion emit light in pulses. The control circuit, before turning on the main transistor, turns on the sub transistor to pass the constant current in the constant current circuit via the sub transistor, and, when turning on the main transistor, turns off the sub transistor.

11 Claims, 10 Drawing Sheets

(58) Field of Classification Search
CPC ... H02M 2001/0064; H02M 2001/342; H02M 3/155; H02M 3/33576
See application file for complete search history.

LIGHT-EMITTING ELEMENT DRIVING DEVICE, SEMICONDUCTOR DEVICE, LIGHT-EMITTING DEVICE, AND LIQUID CRYSTAL DISPLAY DEVICE

CROSS-REFERENCE TO RELATED APPLICATIONS

This nonprovisional application claims priority under 35 U.S.C. § 119(a) on Patent Application No. 2017-172231 filed in Japan on Sep. 7, 2017, the entire contents of which are hereby incorporated by reference.

BACKGROUND OF THE INVENTION

1. Field of the Invention

The present invention relates to light-emitting element driving devices for driving light-emitting elements such as LEDs (light-emitting diodes), and to semiconductor devices, light-emitting devices, and liquid crystal display devices related to such light-emitting element driving devices.

2. Description of Related Art

FIG. 14 is an outline circuit configuration of a constant-current LED driver with a light control (dimming) function. In FIG. 14, an LED driver 900 is an electronic component including a constant current circuit 901 and a transistor (field-effect transistor) 902, and is connected to a light-emitting portion 910 composed of one or more LEDs such that the transistor 902 is arranged between the light-emitting portion 910 and the constant current circuit 901. The LED driver 900 includes a control circuit (unillustrated) that supplies the transistor 902 with a PWM signal (pulse-width modulation signal) to drive the transistor 902 with pulses. Thus, the light-emitting portion 910 emits light in pulses, and adjusting the pulse width permits the light emission brightness of the light-emitting portion 910 to be adjusted.

In some applications, the light-emitting portion 910 can have several tens of LEDs connected in series, in which case the LED driver 900 is required to have a high withstand voltage.

Patent Document 1: JP-2009-188135-A

FIG. 15 shows the on-off waveform of the transistor 902 and the waveform of the current $I_O$ that passes in the constant current circuit 901 via the light-emitting portion 910 and the transistor 902. Only when the transistor 902 is on, a current $I_O$ passes in the constant current circuit 901 and the light-emitting portion 910 emits light. The current value in the constant current circuit 901 does not stabilize at a predetermined constant current value at the same time that the transistor 902 turns on; until a stabilizing time that is required for circuit operation to stabilize has passed, the current waveform shows blunt edges and overshoots. Thus, there is a limit to the narrowing of light emission pulses. Narrowing the pulse width excessively makes the effect of blunt edges and overshoots so large that the constant current can no longer be passed in the light-emitting portion 910 throughout the pulse width that corresponds to the on-period of the transistor 902.

The wider the range of adjustment for the light emission pulse width, the wider the range of light control. Thus, methods that enable the narrowing of light emission pulses are eagerly sought.

SUMMARY OF THE INVENTION

An object of the present invention is to provide a light-emitting element driving device, a semiconductor device, a light-emitting device, and a liquid crystal display device that contribute to the narrowing of light emission pulses.

According to one aspect of the present invention, a light-emitting element driving device includes: a constant current circuit configured to supply a constant current to a light-emitting portion comprising one or more light-emitting elements that emit light by being supplied with electric current; and a main switching element inserted in series between the light-emitting portion and the constant current circuit. The light-emitting element driving device drives the main switching element with pulses, thereby to make the light-emitting portion emit light in pulses. Moreover, the light-emitting element driving device further includes: a circuit configured to pass the constant current in the constant current circuit before the main switching element is turned on.

Specifically, for example, the light-emitting element driving device described above can further include: a sub switching element connected to the node between the main switching element and the constant current circuit; and a control circuit configured to control the main switching element and the sub switching element. The control circuit can turn on the sub switching element before turning on the main switching element, thereby to pass the constant current in the constant current circuit via the sub switching element, and the control circuit can turn off the sub switching element when turning on the main switching element.

More specifically, for example, in the light-emitting element driving device described above, the control circuit can drive the main switching element with cyclic pulses, and can control the on-period of the main switching element in each cycle, thereby to control the light emission brightness of the light-emitting portion. Moreover, in each cycle, control circuit can turn on the sub switching element before turning on the main switching element, thereby to pass the constant current in the constant current circuit via the sub switching element; can turn off the sub switching element when turning on the main switching element; and can turn off the main switching element on expiry of the on-period thereafter.

Specifically, for another example, the light-emitting element driving device described above can further include: an enable terminal for receiving an enable signal. A configuration can then be adopted where operation of the constant current circuit can be stopped based on the enable signal during the whole or part of the period after the main switching element is turned off in one cycle before the next cycle starts.

Specifically, for another example, the light-emitting element driving device described above can further include: a setting terminal for receiving a setting signal. The control circuit can then set the on-period based on the setting signal.

For another example, the light-emitting element driving device described above can include a plurality of blocks each including a constant current circuit, a main switching element, and a sub switching element as described above.

For another example, the light-emitting element driving device described above can include a plurality of blocks each comprising a constant current circuit and a main switching element as described above. A configuration can then be adopted where the main switching element can be driven with pulses for each block so that the light-emitting portion corresponding to the block emits light in pulses, the node in each block is together connected to the sub switching element, and the sub switching element is shared among the plurality of blocks as an element for passing the constant current in the constant current circuit before the main switching element is turned on in each block.

Specifically, for example, the light-emitting portion can be composed of one or more light-emitting diodes.

According to another aspect of the present invention, a semiconductor device constitutes a light-emitting element driving device as described above, and the light-emitting element driving device is configured as an integrated circuit.

According to yet another aspect of the present invention, a light-emitting device includes: a light-emitting portion; and a light-emitting element driving device as described above that makes the light-emitting portion emit light in pulses.

According to still another aspect of the present invention, a liquid crystal display device includes a liquid crystal display panel; and a light-emitting device as described above as a light source for the liquid crystal display panel.

According to the present invention, it is possible to provide a light-emitting element driving device, a semiconductor device, a light-emitting device, and a liquid crystal display device that contribute to the narrowing of light emission pulses.

DETAILED DESCRIPTION OF PREFERRED EMBODIMENTS

Figure 1:
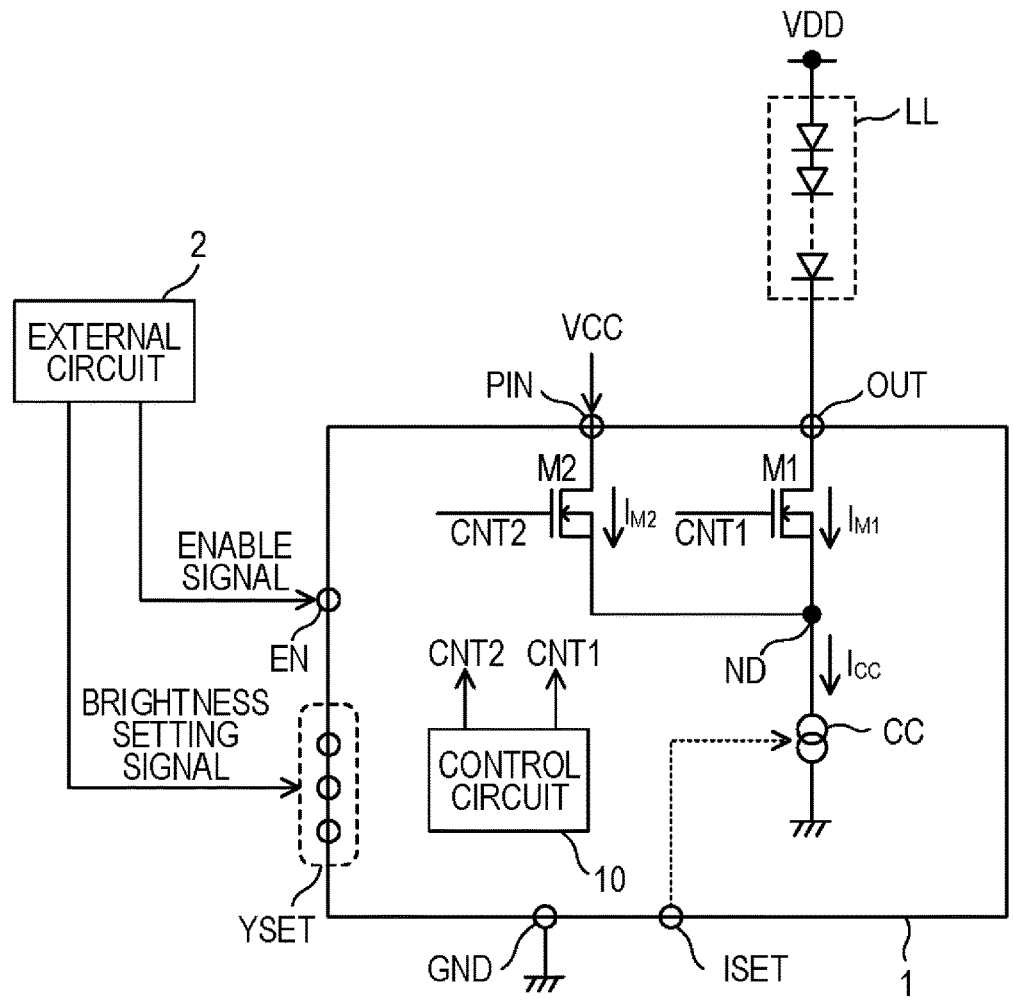
FIG. 1 is a circuit configuration diagram of an LED driver according to an embodiment of the present invention.

Hereinafter, examples embodying the present invention will be described specifically with reference to the accompanying drawings. Among the drawings referred to in the course, the same parts are identified by the same reference numerals, and in principle no overlapping description as to the same parts will be repeated. In the present description, for the sake of simple description, symbols and other designations referring to information, signals, physical quantities, components, and the like are occasionally used with the names of the corresponding information, signals, physical quantities, components, and the like omitted or abbreviated.

FIG. 1 is a circuit configuration diagram of an LED driver 1 according to an embodiment of the present invention. The LED driver 1 includes a main transistor M1, a sub transistor M2, a constant current circuit CC, an output terminal OUT, and a control circuit 10. To the output terminal OUT, a light-emitting portion LL is connected. The light-emitting portion LL can be used, for example, as a light source for a liquid crystal display panel.

Figure 2:
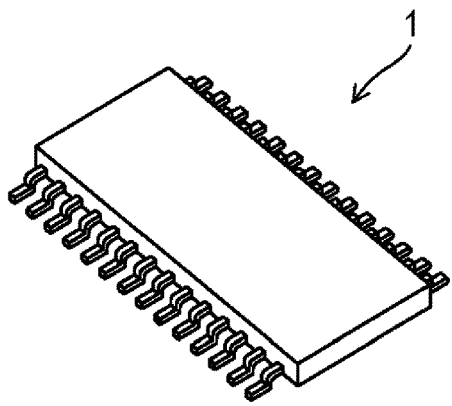
FIG. 2 is a perspective external view of an LED driver according to an embodiment of the present invention.

As shown in FIG. 2, the LED driver 1 can be an electronic component produced by sealing a semiconductor integrated circuit in a casing (package) formed of resin. That is, the main transistor M1, the sub transistor M2, the constant current circuit CC, and the control circuit 10 can be produced in the form of a semiconductor integrated circuit. The LED driver 1 and the light-emitting portion LL together constitute a light-emitting device. It can instead be grasped that the LED driver 1, the light-emitting portion LL, and an external circuit 2, which will be described later, together constitute a light-emitting device. In the following description, the main transistor M1 is occasionally referred to simply as the transistor M1. The same applies to the sub transistor M2.

The light-emitting portion LL is composed of one or more light-emitting elements that emit light by being suppled with electric current. Specifically, it is assumed that the light emitting portion LL is composed of a plurality of LEDs (light-emitting diodes) that are connected in series with each other. Of the plurality of LEDs constituting the light emitting portion LL, the LED arranged at the highest-potential end is, at its anode, fed with a voltage VDD, and the LED arranged at the lowest-potential end is, at its cathode, connected to an output terminal OUT. The plurality of LEDs are all arranged with their forward direction aligned with the direction pointing from where the voltage VDD is applied to the output terminal OUT. The light emitting portion LL may be composed of a single LED. In that case, the voltage VDD is applied to the anode of the single LED constituting the light emitting portion LL, and the output terminal OUT is connected to the cathode of the same single LED.

The main and sub transistors M1 and M2 are each an N-channel MOSFET (MOS (metal-oxide-semiconductor) field-effect transistor). The drain of the main transistor M1 is connected to the output terminal OUT, and the drain of the sub transistor M2 is connected to a voltage input terminal PIN. From a power supply circuit (unillustrated in FIG. 1) provided outside the LED driver 1, a voltage VCC is supplied to the voltage input terminal PIN.

The voltages VDD and VCC are positive direct-current voltages, and it is here assumed that the voltage VDD is higher than the voltage VCC. For example, the voltage VDD is a voltage in the range of 24 V to 60 V (volts), and the voltage VCC is a voltage in the range of 10 V to 20 V (volts). The voltages VDD and VCC may have the same voltage value (in which case the voltages VDD and VCC can be said to be one and the same), or the voltage VCC may be higher than the voltage VDD. The individual circuits, including the constant current circuit CC and the control circuit 10, provided in the LED driver 1 operate using the voltage VCC supplied to them.

The sources of the main and sub transistors M1 and M2 are connected together at a node ND, and are together connected to a current sink portion of the constant current circuit CC. The constant current circuit CC is a circuit that passes a constant current with a predetermined constant current value $I_{CONST}$ from the current sink portion to a ground fixed at a reference potential of 0 V. It should however be noted that, since the current that passes in the constant current circuit CC is supplied via one of the transistors M1 and M2, when transistors M1 and M2 are both off, no current passes in the constant current circuit CC.

The current that passes in the constant current circuit CC (more specifically, the current that passes from the node ND via the constant current circuit CC to the ground) is represented by $I_{CC}$, and the currents (drain currents) that pass in the transistors M1 and M2 are represented by $I_{M1}$ and $I_{M2}$ respectively. When the transistor M1 or M2 is on, a current $I_{CC}$ with the constant current value $I_{CONST}$ passes; when the transistors M1 and M2 are off, the current $I_{CC}$ equals zero.

The control circuit 10 generates control signals CNT1 and CNT2. The control circuit 10 feeds voltage signals based on the control signals CNT1 and CNT2 to the gates of the transistors M1 and M2, and thereby controls the states of the transistors M1 and M2 individually. It is here assumed that the control signal CNT1 itself is fed to the gate of the main transistor M1, and that the control signal CNT2 itself is fed to the gate to the sub transistor M2. The signal levels of the control signals CNT1 and CNT2 are each either a lower level or a high level, the latter being a higher potential than the former. When a high-level voltage signal, or a low-level voltage signal, is being fed to the gate of the main transistor M1, the main transistor M1 is in an on state, or in an off state, respectively. Likewise, when a high-level voltage signal, or a low-level voltage signal, is being fed to the gate of the sub transistor M2, the sub transistor M2 is in an on state, or in an off state, respectively In FIG. 1, the constant current value $I_{CONST}$ is assumed to be variable, and the LED driver 1 is provided with a current value setting terminal ISET for the setting of the constant current value $I_{CONST}$. The constant current value $I_{CONST}$ can be set variably in accordance with the signal applied to the current value setting terminal ISET. Instead, the constant current value $I_{CONST}$ can be set in accordance with the resistance value of a resistor (unillustrated) that is connected between the current value setting terminal ISET and the ground. The current value setting terminal ISET may be omitted from the LED driver 1. In that case, the constant current value $I_{CONST}$ can be set in accordance with the resistance value of a constant current value setting resistor (unillustrated) incorporated in the LED driver 1. The resistance value of the constant current value setting resistor may be fixed, or may be set variably in accordance with a signal received at a brightness setting terminal YSET, which will be described later.

The LED driver 1 is provided with a ground terminal GND. The LED driver 1 may be provided also with an enable terminal EN for receiving an enable signal and a brightness setting terminal YSET for receiving a brightness setting signal. The brightness setting terminal YSET and the enable terminal EN can be connected to an external circuit 2, which can be any circuit provided outside the LED driver 1. In FIG. 1, it is assumed that the brightness setting terminal YSET comprises two or more terminals, though a single terminal can constitute the brightness setting terminal YSET. The ground terminal GND is connected to the ground. The functions of an enable signal and a brightness setting signal will be described later. The terminals OUT, PIN, ISET, GND, YSET, and EN are metal terminals that protrude from the casing (package) of the LED driver 1, and are connected, by wire bonding, to a semiconductor integrated circuit formed inside the casing.

The LED driver 1 (specifically, the control circuit 10) can, by driving the main transistor M1 with pulses, make the light emitting portion LL emit light in pulses. Though the pulse light emission of the light emitting portion LL resulting from the pulse-driving of the main transistor M1 does not necessarily have to be performed cyclically, here, it is assumed that the LED driver 1 (specifically, the control circuit 10) drives the main transistor M1 with cyclic pulses and thereby makes the light emitting portion LL emit light in cyclic pulses. Meanwhile, the LED driver 1 (specifically, the control circuit 10) can, through pulse-width modulation, control the on-period of the main transistor M1 in each cycle and thereby control the light emission brightness of the light emitting portion LL (the average light emission brightness in one cycle).

Figure 3:
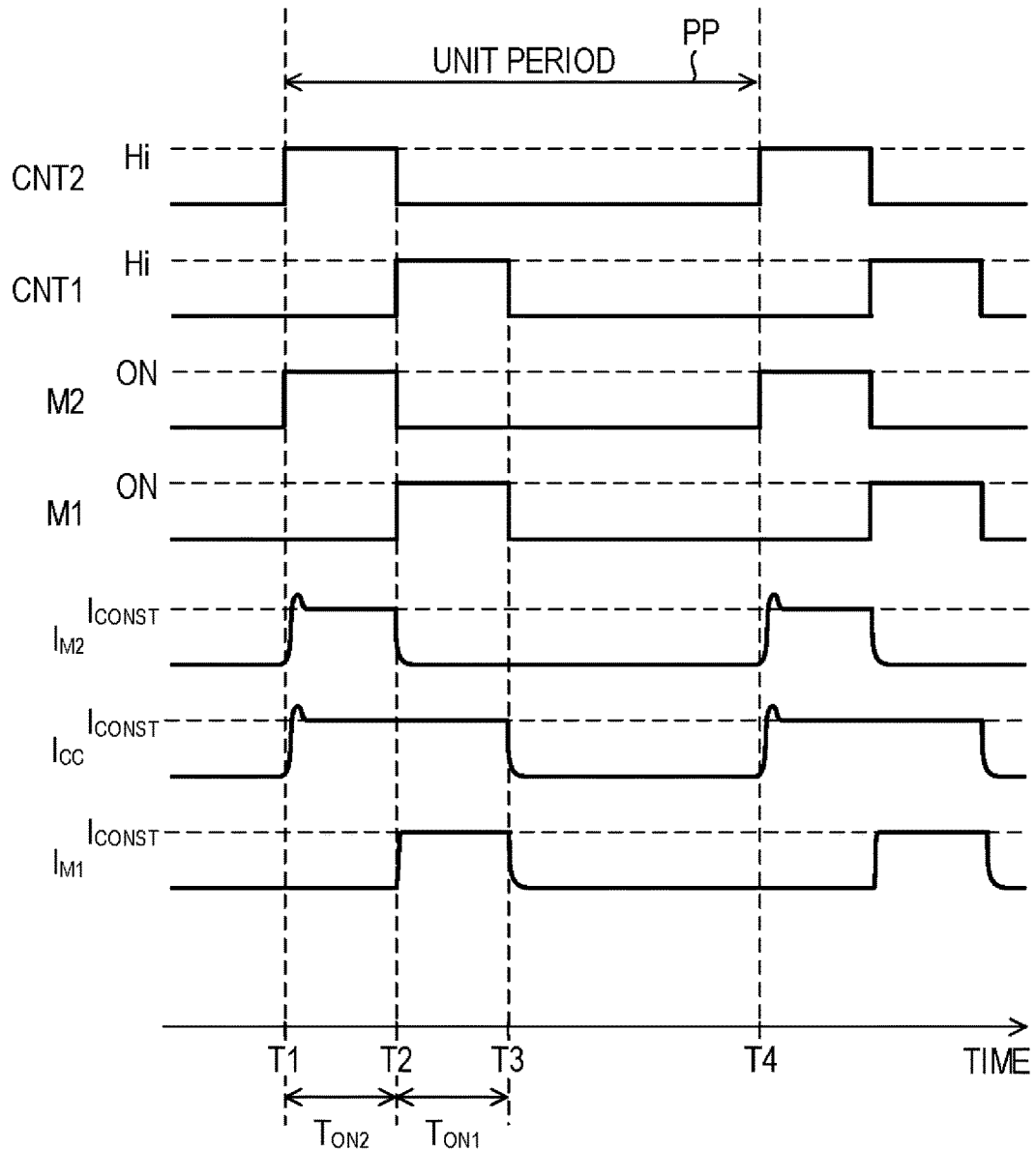
FIG. 3 is a diagram showing voltage and current waveforms at relevant points in relation to an LED driver according to an embodiment of the present invention.

FIG. 3 shows voltage and current waveforms at relevant points in relation to the LED driver 1. The period corresponding to one cycle of the cyclic driving of the main transistor M1 will be referred to as the unit period. For the sake of concreteness, the following description focuses attention to a given one unit period referred to as unit period PP. Assume that unit period PP is a period from time point T1 to time point T4. That is, time point T1 is the start time point of unit period PP, and time point T4 is the end time point of unit period PP. The end time point T4 of unit period PP coincides with the start time point of the unit period subsequent to unit period PP. Time points T1, T2, T3, and T4 occur in this order.

Immediately before unit period PP, the control signals CNT1 and CNT2 are both at low level, and thus the transistors M1 and M2 are both off, so that the currents $I_{CC}$, $I_{M1}$, and $I_{M2}$ all equal zero. Between time points T1 and T2, the control signal CNT1 is at low level and the control signal CNT2 is at high level; thus, the main transistor M1 is off and the sub transistor M2 is on. Between time points T2 and T3, the control signal CNT1 is at high level and the control signal CNT2 is at low level; thus, the main transistor M1 is on and the sub transistor M2 is off. Between time points T3 and T4, the control signals CNT1 and CNT2 are both at low level, and thus the transistors M1 and M2 are both off. The period between time points T1 and T2 corresponds to the on-period of the sub transistor M2, referred to as the sub on-period $T_{ON2}$, and the period between time points T2 and T3 corresponds to the on-period of the main transistor M1, referred to as the main on-period $T_{ON1}$. More details will now be given.

At time point T1, of the control signals CNT1 and CNT2, only the control signal CNT2 is switched from low level to high level, with the result that, of the transistors M1 and M2, only the sub transistor M2 turns on (meanwhile, the main transistor M1 is kept off). Thus, starting at time point T1, a current starts to pass in the constant current circuit CC via the sub transistor M2. Immediately after time point T1, the sub transistor M2 and the constant current circuit CC are in a transient state, and this causes the current values of the currents $I_{M2}$ and $I_{CC}$ to deviate slightly from the constant current value $I_{CONST}$; even so, before time point T2 is reached, they comes into a stable state, and thus the current values of the currents $I_{M2}$ and $I_{CC}$ become equal to the constant current value $I_{CONST}$. As is well known, a transistor is said to turn on when its state switches from off to on; reversely, a transistor is said to turn off when its state switches from on to off.

At the time point that a predetermined time corresponding to the sub on-period $T_{ON2}$ has passed since time point T1, that is, at time point T2, the control circuit 10 switches the control signal CNT2 from high level to low level and simultaneously switches the control signal CNT1 from low level to high level. As a result, at time point T2, the sub transistor M2 turns off, and simultaneously the main transistor M1 turns on. In other words, at time point T2, in synchronism with the turning-on of the main transistor M1, the sub transistor M2 turns off. Then, the path of the current that passes in the constant current circuit CC switches from one via the sub transistor M2 to one via the main transistor M1. This switching does not cause the current value of the current $I_{CC}$ to change from the constant current value $I_{CONST}$. From time point T2 to time point T3, a current $I_{CC}$ with the constant current value $I_{CONST}$ passes via, of the transistors M1 and M2, the main transistor M1; thus, a current with the constant current value $I_{CONST}$ passes in the light-emitting portion LL as well, making it emit light.

At the time point that the main on-period $T_{ON1}$ has passed since time point T2, that is, at time point T3, the control circuit 10, while keeping the control signal CNT2 at low level, switches the control signal CNT1 from high level to low level. This causes the main transistor M1 to turn off, and thus the light-emitting portion LL stops emitting light. In the period from time point T3 to time point T4, the control signal CNT1 and 2 are kept at low level, and thus the transistors M1 and M2 are kept off.

As will be understood from what has been described above, if the transient state is ignored, between time points T1 and T2, while the current values of the currents $I_{M2}$ and $I_{CC}$ equal the constant current value $I_{CONST}$, the current $I_{M1}$ equals zero; between time points T2 and T3, while the current values of the currents $I_{M1}$ and $I_{CC}$ equal the constant current value $I_{CONST}$, the current $I_{M2}$ equals zero. Thus, in unit period PP, only between time points T2 and T3 does a current according to the constant current value $I_{CONST}$ pass in the light-emitting portion LL, making the light-emitting portion LL emit light. Although here, for the sake of concreteness, attention is paid to a single unit period referred to as unit period PP, similar operation takes place in every other unit period as in unit period PP.

As described above, in the LED driver 1, in every cycle (that is, during every unit period), before the main transistor M1 is turned on, the sub transistor M2 is turned on so that a current (a current according to the constant current value $I_{CONST}$) passes in the constant current circuit CC via the sub transistor M2, and when the main transistor M1 is turned on, the sub transistor M2 is turned off. More specifically, at the same time that the main transistor M1 is turned on (in other words, in synchronism with it being turned on), the sub transistor M2 is turned off. When the main on-period $T_{ON1}$ has passed since the turning-on of the main transistor M1, the main transistor M1 is turned off. Here, it should be understood that "at the same time" or "simultaneously" is meant to convey not only exact simultaneity but allow for a slight width of time.

With the LED driver 1, the main transistor M1 can be turned on when the constant current circuit CC is already operating stably. This makes possible the narrowing of light emission pulses.

What has just been mentioned will now be elaborated. As discussed earlier, in the LED driver 900 in FIG. 14, the current value in the constant current circuit 901 does not stabilize at a predetermined constant current at the same time that the transistor 902 turns on; until a stabilizing time that is required for circuit operation to stabilize has passed, the current waveform shows blunt edges and overshoots (see FIG. 15). Thus, with the LED driver 900, there is a limit to the narrowing of light emission pulses. In particular, in applications where the light-emitting portion 910 has several tens of LEDs connected in series, and in applications that require high currents, the just-mentioned stabilizing time tends to increase, and this makes the narrowing of light emission pulses more difficult.

Conventional low-withstand-voltage LED drivers are capable of pulse driving with pulse widths of the order of 10 to 100 ns (nanoseconds), but there, the current value is limited to 50 mA (milliamperes) or less. Even so, they pose few problems in applications, such as LED display panels and digital signage, where LED light is radiated directly; on the other hand, for use in backlights for liquid crystal display panels, the current value tends to be insufficient, because backlights for liquid crystal display panels typically require a constant current of 100 mA or more. According to known gradation control, the brightness of a screen is varied by adjusting the time for which such a constant current is passed in LEDs; however, with the LED driver 900 in FIG. 14, it is difficult to obtain response fast enough to allow the narrowing of pulses.

Figure 4:
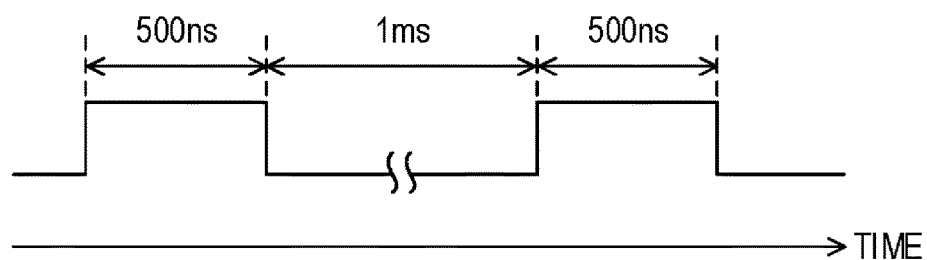
FIG. 4 is a diagram showing an example of a waveform in relation to light emission.
Figure 14:
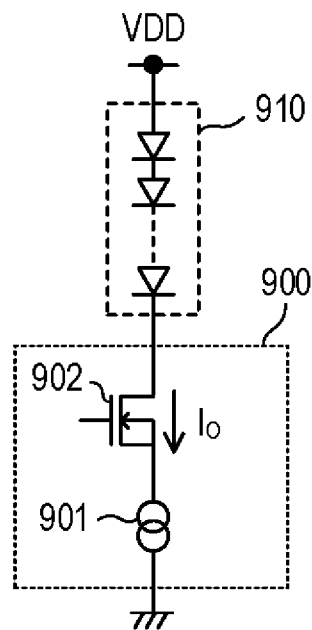
FIG. 14 is a circuit configuration diagram of a conventional LED driver.
Figure 15:
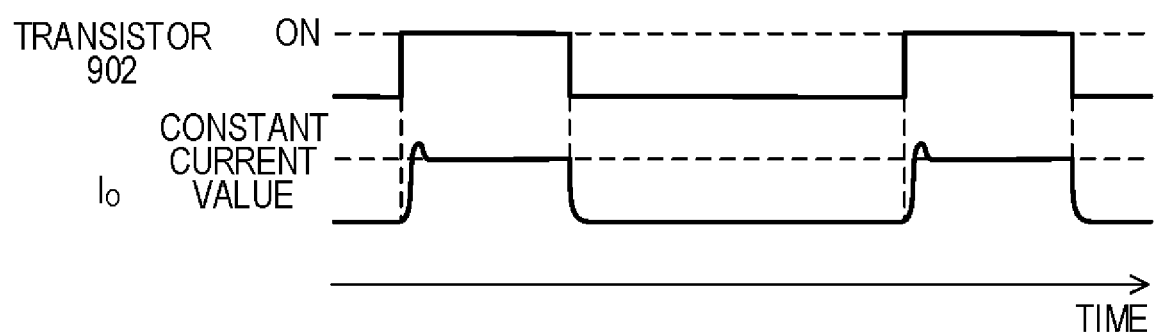
FIG. 15 is a diagram illustrating the operation of, and a current wave form in, a conventional LED driver.

For example, in the LED driver 900 in FIG. 14, if the constant current value in the constant current circuit 901 is set at 100 mA or more, the light emission pulse width can be narrowed down to about 500 nm but not beyond (narrowing it further down makes notable the effect of blunt edges and overshoots). Thus, minimizing the brightness of the screen requires repeating operation in which, as shown in FIG. 4, light is emitted only for 500 ns and is then kept unemitted for a predetermined light-off time (for example, 1 ms). It is possible, by increasing the light-off time (up to, for example, 10 ms), to further reduce the brightness of the screen; however, an excessively long light-off time causes the screen to appear to flicker, and thus there is a limit also to increasing the light-off time. For another example, it is possible, by reducing the constant current value with the light-off time at 1 ms and the light-on time at 500 ns, to reduce the brightness of the screen without causing flicker, but this causes a change in the hue of the light emitted by the LEDs.

Even if, for discussion's sake, the constant current value is set at 100 mA or more, if the light emission pulse width can be narrowed down to 50 ns, it is possible to reduce the brightness of the screen down to one-tenth without causing flicker. That is, it is possible to increase the width of gradation adjustment.

With the LED driver 1 according to this embodiment, the main transistor M1 can be turned on when the constant current circuit CC is already operating stably; it is thus possible to narrow light emission pulses regardless of the constant current value $I_{CONST}$ in the constant current circuit CC. This holds even where high withstand voltages are required. That is, according to this embodiment, narrow-pulse constant-current driving is possible without reliance on the value of the constant current or the value of the output voltage (the voltage value at the output terminal OUT); it is thus possible to provide an LED driver that boasts high output current, high withstand voltage, and fast response.

A description will now be given of the brightness setting signal to be fed to the brightness setting terminal YSET. The brightness setting signal is a signal that is fed from the external circuit 2, and based on the brightness setting signal, the control circuit 10 determines the main on-period $T_{ON1}$ in each unit period. Specifically, based on the brightness setting signal, the control circuit 10 can adjust the length of the main on-period $T_{ON1}$ in a plurality of steps. In a case where the length of the unit period is fixed, in accordance with the brightness setting signal, the ratio of the length of the light-on period of the light-emitting portion LL (that is, the main on-period $T_{ON1}$) to the unit period is determined. For example, the brightness setting terminal YSET constitutes an SPI (serial peripheral interface), and through communication by the SPI, the brightness setting signal is fed to the brightness setting terminal YSET. It should however be noted that, so long as the length of the main on-period $T_{ON1}$ can be specified, there is no restriction on how the brightness setting signal and the brightness setting terminal YSET are implemented.

The sub on-period $T_{ON2}$ can be a prescribed fixed length of time, and can be determined with consideration given to the time required for the operation of the constant current circuit CC to stabilize. In the LED driver 900 in FIG. 14, the faster the response of the constant current circuit 901, the more advantageous to the narrowing of light emission pulses. However, making the response of the constant current circuit 901 faster leads to an increase in the circuit scale of the constant current circuit 901. With the LED driver 1 of this embodiment, fast response is not required in the constant current circuit; this is advantageous to the reduction of the circuit scale of the constant current circuit, and allows the use of slow-response constant current circuits that require a stabilizing time of the order of 1 μs (microseconds) to several microseconds.

The main transistor M1 is given a withstand voltage (a low to high withstand voltage) that suits the magnitude of the voltage VDD and the configuration of the light-emitting portion LL. The sub transistor M2 may be given a low withstand voltage. The main and sub transistors M1 and M2 may have different withstand voltages, or may have equal withstand voltages.

For convenience' sake, the configuration, operation, and other features of the LED driver 1 and the circuits peripheral to the LED driver 1 as they are described above are referred to as the basic practical example. Described below by way of a plurality of practical examples will be applied, modified, and other technologies related to the LED driver 1 and the circuits peripheral to the LED driver 1. Unless otherwise stated, or unless inconsistent, any of the features of the basic practical example is applicable to any of the practical examples presented below; for any feature of a practical example that is inconsistent with one in the basic practical example, its description in connection with the practical example prevails. Unless inconsistent, any feature of any of the plurality of practical examples presented below can be applied to any other practical example (that is, any two or more of the plurality of practical examples can be combined together).

First Practical Example

A first practical example will now be described. An enable signal is a signal that is fed from the external circuit 2. The enable signal is a digital signal that has a logic value of either "0" or "1" at a time. When the enable signal has a logical value of "1", the various kinds of operation within the LED driver 1 described above in connection with the basic practical example take place (the basic practical example assumes that the logic value of the enable signal is held at "1"); when the enable signal has a logic value of "0", a particular circuit in the LED driver 1 stops operating. That is, it can be said as follows: an enable signal having a logic value of "0" is a signal that demands that a particular circuit remain out of operation, and an enable signal having a logic value of "1" is a signal that demands that a particular circuit remain in operation (a signal that does not demand that a particular circuit remain out of operation). The particular circuit includes at least the constant current circuit CC.

Even when the transistors M1 and M2 are both off, if the logic value of the enable signal is "1" and the constant current circuit CC is not out of operation, a given bias current passes in the constant current circuit CC and the constant current circuit CC consumes electric power accordingly. When the logic value of the enable signal is "0" and the constant current circuit CC is out of operation, regardless of the states of the transistors M1 and M2, no current passes in the constant current circuit CC, and the constant current circuit CC consumes no or substantially no electric power. That is, regardless of the states of the transistors M1 and M2, the power consumption of the constant current circuit CC is higher when the logic value of the enable signal is "1" than when it is "0".

Figure 5:
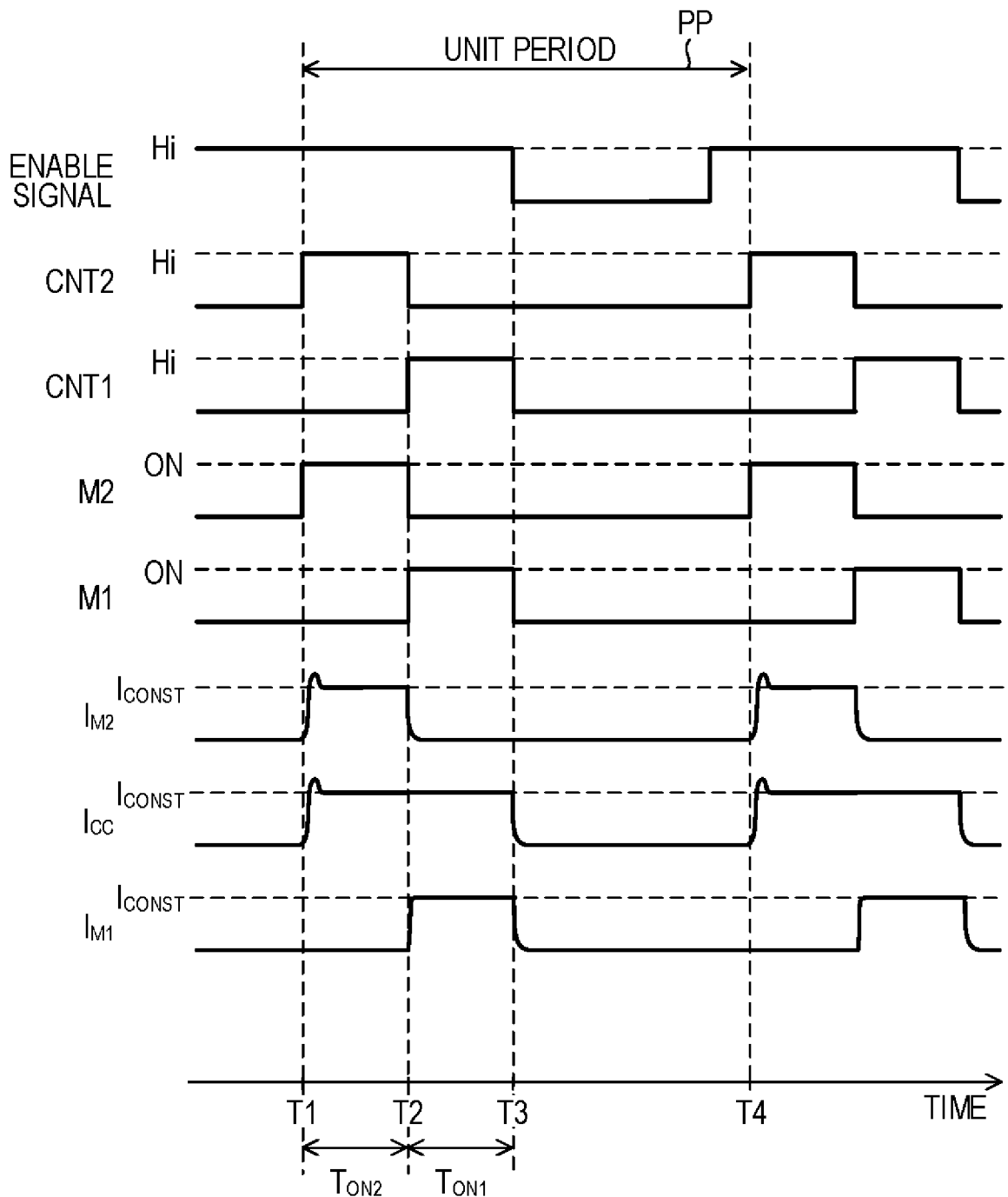
FIG. 5 shows voltage and current waveforms at relevant points in relation to an LED driver according to a first practical example belonging to an embodiment of the present invention.

FIG. 5 shows, with respect to a first practical example, voltage and current waveforms at relevant points in relation to the LED driver 1. Compared with FIG. 3, FIG. 5 additionally shows the signal waveform of an enable signal. It is here assumed that when the enable signal is at high level, or at low level, it represents a logic value of "1", or a logic value of "0", respectively.

It is possible, in each unit period, to keep the enable signal at low level during the whole or part of the period in which the transistors M1 and M2 are both off, and to keep the enable signal at high level during the rest of the unit period. In this way, it is possible to achieve power saving in the LED driver 1 during the period in which no current needs to be passed in the light-emitting portion LL. In the example in FIG. 5, in unit period PP, only during the period from time point T3 to a time point a predetermined time earlier than time point T4 is the enable signal kept at low level (the same is true with every other unit period). In other respects, the signal waveforms here are similar to those shown in connection with the basic practical example.

The above-mentioned particular circuit may further include the control circuit 10. It is then assumed that the conductors to which the control signals CNT1 and CNT2 are applied are connected to the ground via resistors, and that, when the control circuit 10 is out of operation, the control signals CNT1 and CNT2 remains fixed at low level.

Second Practical Example

A second practical example will now be described. It is possible, using an enable signal, to carry out a different sequence of on/off timing control for the sub transistor M2 than those in FIGS. 3 and 5. Even in that case, stable fast response is obtained so long as the procedure—first the current $I_{CC}$ is passed via the sub transistor M2 and then the current $I_{CC}$ is passed via the main transistor M1—is observed.

Figure 6:
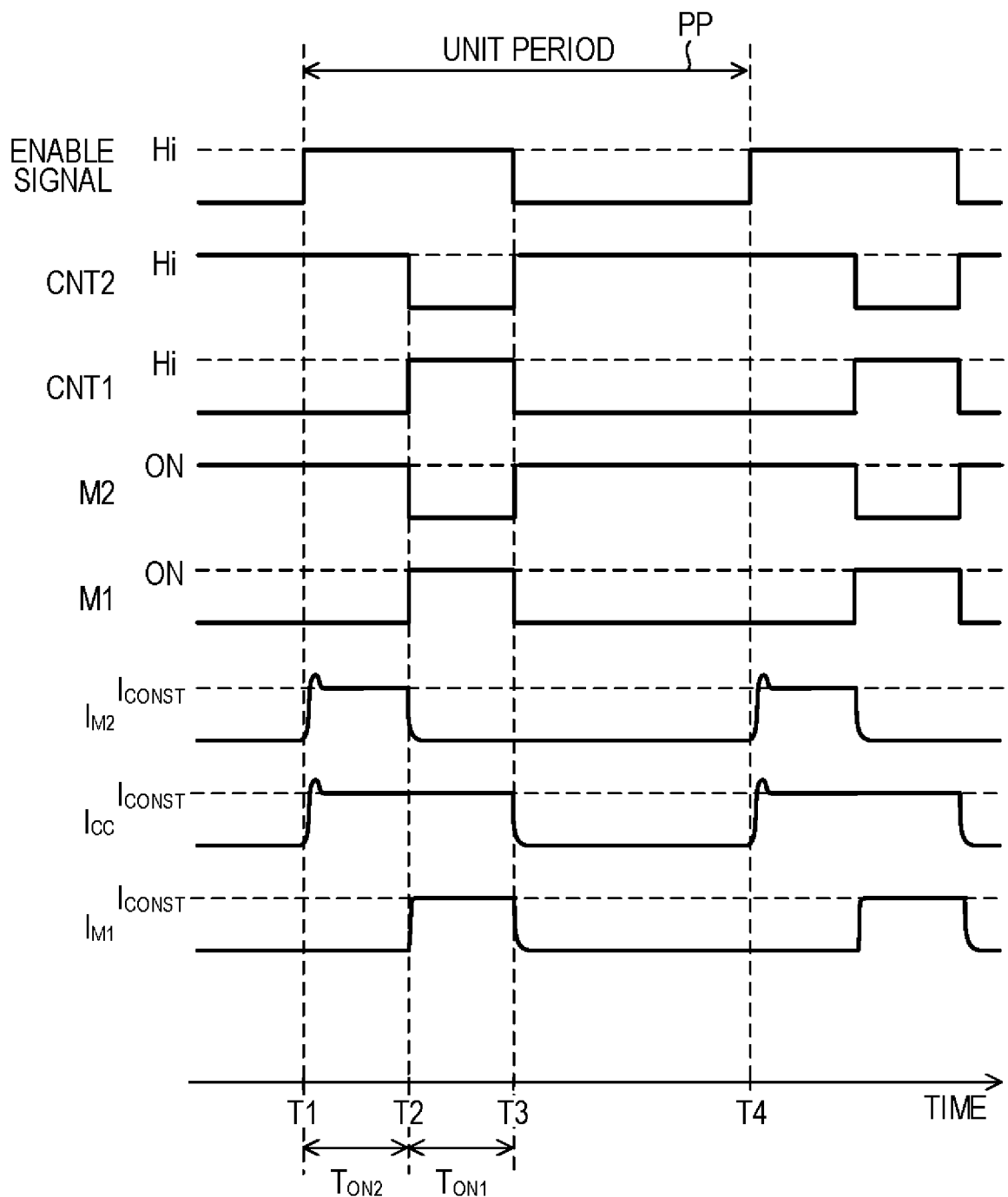
FIG. 6 shows voltage and current waveforms at relevant points in relation to an LED driver according to a second practical example belonging to an embodiment of the present invention.

FIG. 6 shows, with respect to a second practical example, voltage and current waveforms at relevant points in relation to the LED driver 1. In the example in FIG. 6, compared to the one described above with reference to FIG. 3, the waveform of an enable signal is additionally shown, and the waveform of the control signal CNT2 is modified (in other respects, the signal waveforms here are similar to those shown in connection with the basic practical example).

Specifically, in the example in FIG. 6, in unit period PP, the enable signal is kept at high level between time points T1 and T3, and is kept at low level between time points T3 and T4; the control signal CNT2 is kept at high level between time points T1 and T2 and between time points T3 and T4, and is kept at low level between time points T2 and T3. As a result, the sub transistor M2 is on not only between time points T1 and T2 but also between time points T3 and T4; even so, between time points T3 and T4, the enable signal, which is then at low level, keeps the constant current circuit CC out of operation, and thus, between time points T3 and T4, no current passes in the sub transistor M2 and the constant current circuit CC.

What can be said about both the first and second practical examples is that, in unit period PP, the external circuit 2 may feed a low-level enable signal to the enable terminal EN after the main transistor M1 is turned off at time point T3, during the whole or part of the period between time points T3 and T4. In general terms, that is, if defined without restriction to unit period PP, in one unit period (in one cycle), the external circuit 2 can feed a low-level enable signal to the enable terminal EN after the main transistor M1 is turned off, during the whole or part of the period thereafter up to the next unit period (the next cycle); then, in the period in which the enable signal is at low level, the LED driver 1 keeps the constant current circuit CC out of operation.

Third Practical Example

A third practical example will now be described. In the following description including the description of the third practical example, unless otherwise stated, it is assumed that the logic value of the enable signal is held at "1".

In a configuration where the control signals CNT1 and CNT2 are fed directly to the gates of the transistors M1 and M2 respectively, when the path across which the constant current is passed is switched from the one via the sub transistor M2 to the one via the main transistor M1 (that is, near time point T2 in FIG. 3), there can occur a period, though very short, in which the transistors M1 and M2 are on or off simultaneously. This possibility can be lessened by adopting one of the first and second modified examples of control described below.

Figure 7A:
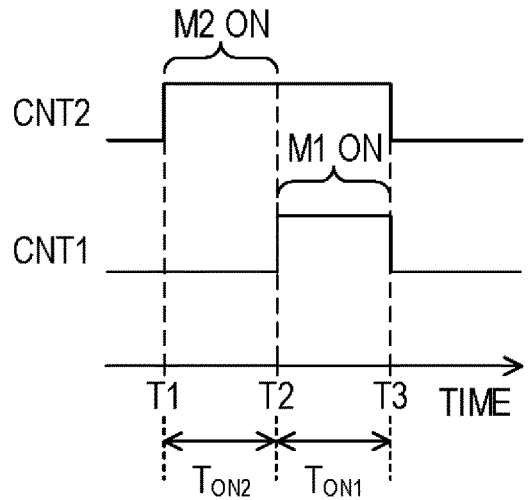
FIGS. 7A and 7B are diagrams showing examples of the relationship between control signals and the control of transistors according to a third practical example belonging to an embodiment of the present invention.
Figure 7B:
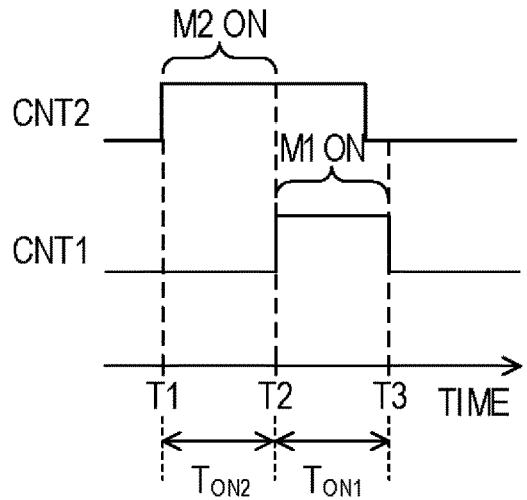
Figure 7B:
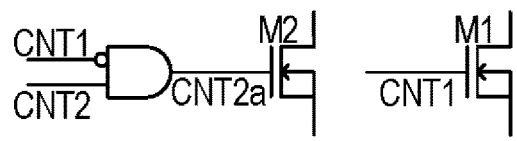

FIG. 7A shows a first modified example of control. In the first modified example of control, in unit period PP, the control circuit 10 generates a control signal CNT2 that is at high level only between time points T1 and T3 and a control signal CNT1 that is at high level only between time points T2 and T3; the control circuit 10 feeds the control signal CNT1 directly to the gate of the main transistor M1, while feeding a control signal CNT2a based on the control signals CNT1 and CNT2 to the gate of the sub transistor M2. Accordingly, there is provided a logic circuit that generates the control signal CNT2a from the control signals CNT1 and CNT2 such that the sub transistor M2 is on only between time points T1 and T2. In the first modified example of control, the time point at which the control signal CNT2 turns from high level to low level may be later than time point T2 but earlier than time point T3 (see FIG. 7B).

Although here, for the sake of concreteness, attention is paid to a single unit period referred to as unit period PP, similar operation takes place in every other unit period as in unit period PP.

Specifically, in the first modified example of control, in each unit period (that is, in each cycle), the control circuit 10 feeds a first control signal (CNT1; see FIGS. 7A and 7B) with a pulse width corresponding to the main on-period $P_{ON1}$ to the gate of the main transistor M1, thereby to keep the main transistor M1 on only during the main on-period $P_{ON1}$ (to keep it on, in terms of unit period PP, only between time points T2 and T3); on the other hand, the control circuit 10 generates a second control signal (CNT2; see FIG. 7A or 7B) with a pulse width corresponding to the length of time longer than the sub on-period $P_{ON2}$ but equal to or less than the sum of the sub on-period $P_{ON2}$ and the main on-period $P_{ON1}$ and feeds a control signal (CNT2a) based on those first and second control signals to the gate of the sub transistor M2, thereby to control the sub transistor M2 (to keep it on, in terms of unit period PP, only between time points T1 and T2).

Figure 8:
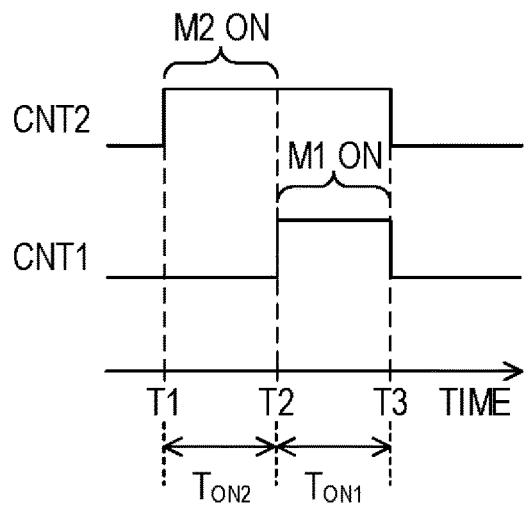
FIG. 8 is a diagram showing another example of the relationship between control signals and the control of transistors according to the third practical example belonging to an embodiment of the present invention.
Figure 8:
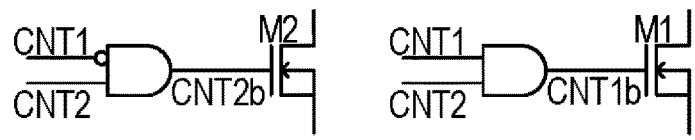

FIG. 8 shows a second modified example of control. In the second modified example of control, in unit period PP, the control circuit 10 generates a control signal CNT2 that is at high level only between time points T1 and T3 and a control signal CNT1 that is at high level only between time points T2 and T3; the control circuit 10 feeds a control signal CNT1b based on the control signals CNT1 and CNT2 to the gate of the main transistor M1, while feeding a control signal CNT2b based on the control signals CNT1 and CNT2 to the gate of the sub transistor M2. Accordingly, there are provided a logic circuit that generates the control signal CNT2b from the control signals CNT1 and CNT2 such that the sub transistor M2 is on only between time points T1 and T2, and a logic circuit that generates the control signal CNT1b from the control signals CNT1 and CNT2 such that the main transistor M1 is on only between time points T2 and T3. Although here, for the sake of concreteness, attention is paid to a single unit period referred to as unit period PP, similar operation takes place in every other unit period as in unit period PP.

Specifically, in the second modified example of control, in each unit period (that is, in each cycle), the control circuit 10 generates a first control signal (CNT1; see FIG. 8) with a pulse width corresponding to the main on-period $P_{ON1}$ and a second control signal (CNT2; see FIG. 8) with a pulse width corresponding to the length of time equal to the sum of the sub on-period $P_{ON2}$ and the main on-period $P_{ON1}$; the control circuit 10 feeds one control signal (CNT2b) based on the first and second control signals to the gate of the sub transistor M2, thereby to control the sub transistor M2 (to keep it on, in terms of unit period PP, only between time points T1 and T2), and the other control signal (CNT1b) based on the first and second control signals to the gate of the main transistor M1, thereby to control the main transistor M1 (to keep it on, in terms of unit period PP, only between time points T2 and T3).

Fourth Practical Example

Figure 9:
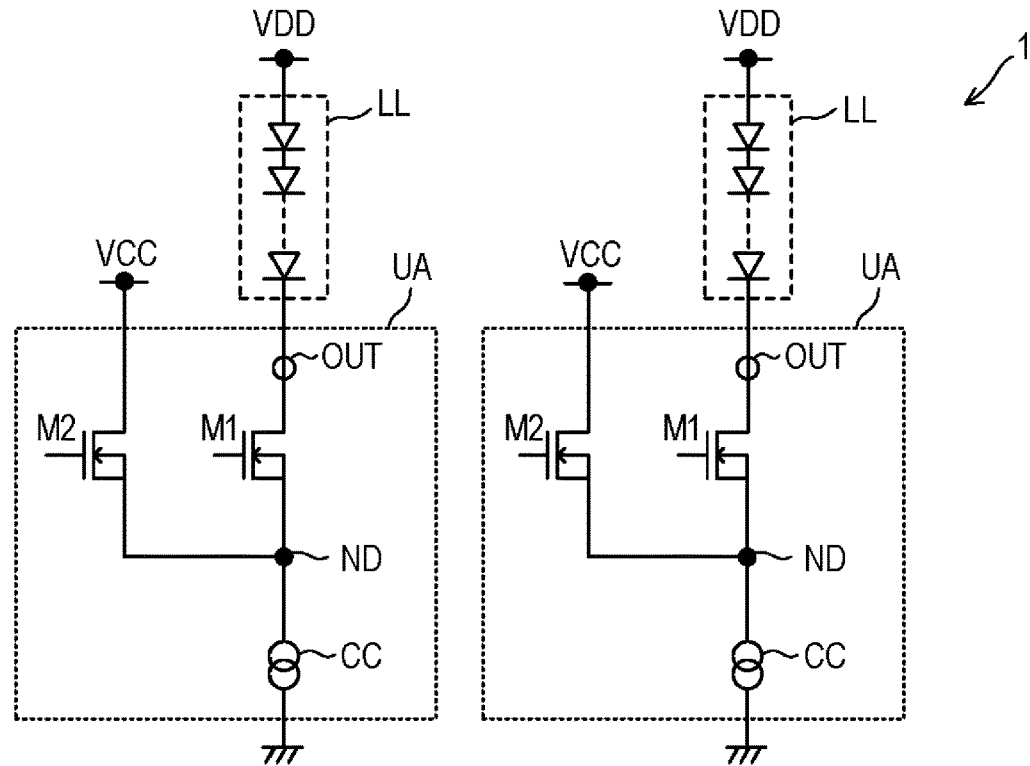
FIG. 9 is a circuit configuration diagram of an LED driver according to a fourth practical example belonging to an embodiment of the present invention.

A fourth practical example will now be described. As shown in FIG. 9, the LED driver 1 may be provided with a plurality of unit blocks UA each including a constant current circuit CC, a main transistor M1, a sub transistor M2, and an output terminal OUT. Although the number of unit blocks UA is two in FIG. 9, it may instead be three or more. For each unit block UA, a light-emitting portion LL is connected to the output terminal OUT. That is, the LED driver 1 of the fourth practical example can, for each unit block UA, drive the main transistor M1 in the unit block UA with pulses and thereby make the light-emitting portion LL connected to that unit block UA emit light in pulses. More specifically, the LED driver 1 of the fourth practical example can, for each unit block UA, drive the main transistor M1 in the unit block UA with cyclic pulses and thereby make the light-emitting portion LL connected to that unit block UA emit light in cyclic pulses.

The interconnection between the constant current circuit CC, the main transistor M1, the sub transistor M2, and the output terminal OUT in each unit block UA and the light-emitting portion LL is similar to that described in connection with the basic practical example, and is common to the plurality of unit blocks UA. The operation of the constant current circuit CC, the main transistor M1, and the sub transistor M2 in each unit block UA is similar to the operation of the constant current circuit CC, the main transistor M1, the sub transistor M2 described in connection with any of the basic practical example and the first to third practical examples, and the operation of each unit block UA is controlled by the control circuit 10.

The control circuit 10 in the fourth practical example may be configured to set the main on-period $T_{ON1}$ for each unit block UA based on the brightness setting signal. For example, there may be provided a plurality of current value setting terminals ISET so that the constant current value $I_{CONST}$ can be set for each unit block UA. The plurality of unit blocks UA provided in the LED driver 1 may be divided into a plurality of groups, and the control circuit 10 may be configured to set the main on-period $T_{ON1}$ for each group based on the brightness setting signal. Likewise, the constant current value $I_{CONST}$ may be settable for each group. One or more unit blocks UA belong to each group.

The period in which the main transistor M1 is on may coincide among the plurality of unit blocks UA, may partly overlap among the plurality of unit blocks UA, or may differ among the plurality of unit blocks UA. Specifically, the period in which the main transistor M1 in a first unit block UA is on may coincide with, or partly overlap with, or is separate from the period in which the main transistor M1 in a second unit block UA is on. In any case, the sub on-period $T_{ON2}$ may be common to the plurality of unit blocks UA.

Fifth Practical Example

Figure 10:
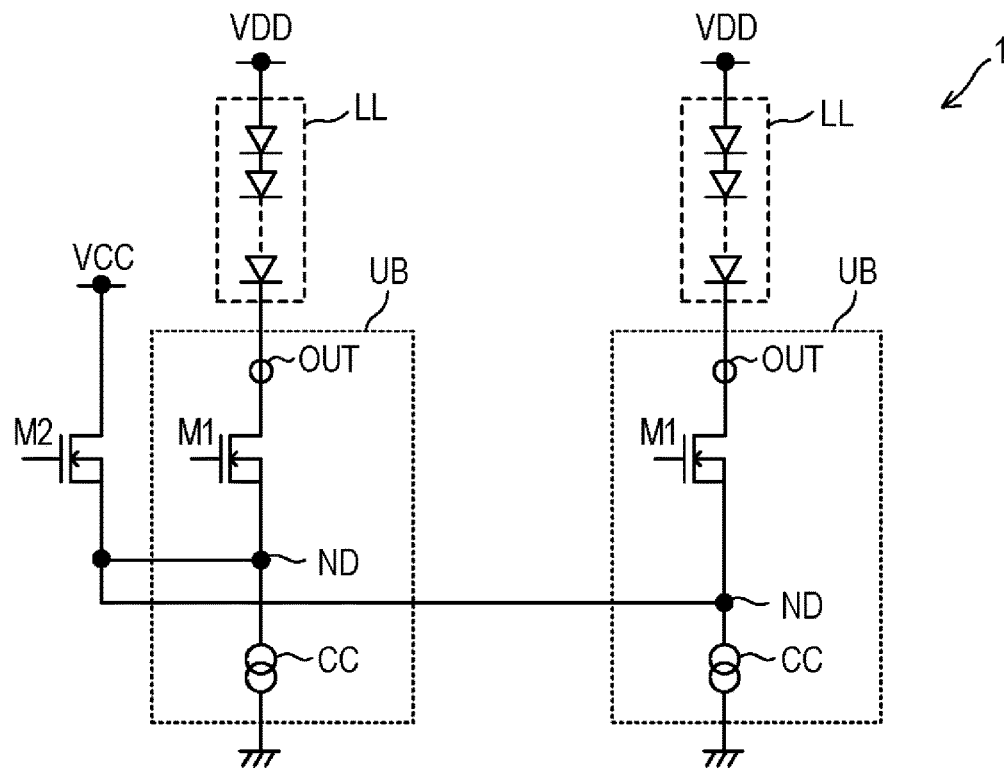
FIG. 10 is a circuit configuration diagram of an LED driver according to a fifth practical example belonging to an embodiment of the present invention.

A fifth practical example will now be described. As shown in FIG. 10, the LED driver 1 may be provided with, in association with a single sub transistor M2, a plurality of unit blocks UB each including a constant current circuit CC, a main transistor M1, and a output terminal OUT. Although the number of unit blocks UB is two in FIG. 10, it may instead be three or more. For each unit block UB, a light-emitting portion LL is connected to the output terminal OUT. That is, the LED driver 1 of the fifth practical example can, for each unit block UB, drive the main transistor M1 in the unit block UB with pulses and thereby make the light-emitting portion LL connected to that unit block UB emit light in pulses. More specifically, the LED driver 1 of the fifth practical example can, for each unit block UB, drive the main transistor M1 in the unit block UB with cyclic pulses and thereby make the light-emitting portion LL connected to that unit block UB emit light in cyclic pulses.

The interconnection between the constant current circuit CC, the main transistor M1, and the output terminal OUT in each unit block UB and the light-emitting portion LL is similar to that described in connection with the basic practical example, and is common to the plurality of unit blocks UB. The operation of the constant current circuit CC and the main transistor M1 in each unit block UB is similar to the operation of the constant current circuit CC and the main transistor M1 described in connection with any of the basic practical example and the first to third practical examples, and the operation of each unit block UB is controlled by the control circuit 10.

In each unit block UB, a node ND is formed at the connection point between the source of the main transistor M1 and the current sink portion of the constant current circuit CC. The plurality of nodes ND in the plurality of unit blocks UB respectively are together connected to the source of the single sub transistor M2, and this single sub transistor M2 is shared among the plurality of unit blocks UB as a device that, in each unit block UB, passes a constant current in the constant current circuit CC before the main transistor M1 is turned on.

That is, in each cycle (that is, in each unit period), the control circuit 10 turns on the sub transistor M2 before turning on the main transistor M1 in each unit block UB, thereby to pass a current (a current according to the constant current value $I_{CONST}$) in the constant current circuit CC in each unit block UB via the sub transistor M2, and turns off the sub transistor M2 when turning on the main transistor M1 in each unit block UB. More specifically, the control circuit 10, at the same time that it turns on the main transistor M1 in each unit block UB (in other words, in synchronism with that turning-on), turns off the sub transistor M2. Then, when the main on-period $T_{ON1}$ has passed since the turning-on of the main transistor M1 in each unit block UB, the control circuit 10 turns off the main transistor M1 in each unit block UB.

In each cycle (in each unit period), the time point at which the plurality of main transistors M1 in the plurality of unit blocks UB respectively turn on is common among them; in addition, the time point at which the plurality of main transistors M1 in the plurality of unit blocks UB respectively thereafter turn off also is common among them. Instead, the time point at which the plurality of main transistors M1 in the plurality of unit blocks UB respectively turn off (that is, time point T3 in FIG. 3) may differ among the plurality of main transistors M1, and in a case where the time point differs among the plurality of main transistors M1, then the main on-period $T_{ON1}$ differs among the plurality of main transistors M1.

Thus, the control circuit 10 of the fifth practical example can be configured to set the main on-period $T_{ON1}$ for each unit block UB based on the brightness setting signal. Instead, the plurality of unit blocks UB provided in the LED driver 1 can be divided into a plurality of groups, and the control circuit 10 may be configured to set the main on-period $T_{ON1}$ for each group based on the brightness setting signal. One or more unit blocks UB belong to each group. For example, there may be provided a plurality of current value setting terminals ISET so that the constant current value $I_{CONST}$ is settable for each unit block. Instead, the constant current value $I_{CONST}$ may be settable for each group.

Sixth Practical Example

Figure 11:
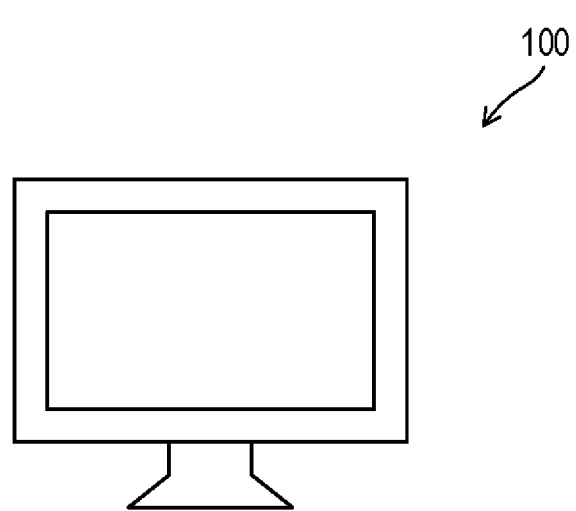
FIG. 11 is an exterior view of a liquid crystal display device according to a sixth practical example belonging to an embodiment of the present invention.

A sixth practical example will now be described. FIG. 11 is directed to a sixth practical example, and is an exterior view of a liquid crystal display device 100 provided with a liquid crystal display panel. The liquid crystal display device 100 may be a stay-at-home display device, or may be a display device configured to be portable. The light-emitting portion LL described above can be used as a light source for the liquid crystal display panel, and the LED driver 1 of any of the basic practical example and the first to fifth practical examples can be used as an LED driver for making the light-emitting portion LL emit light in pulses. An outline of the configuration of the liquid crystal display device 100 will be described below on the assumption that it incorporates, as an LED driver 1A, the LED driver 1 of the type presented as the fourth practical example (see FIG. 9).

Figure 12:
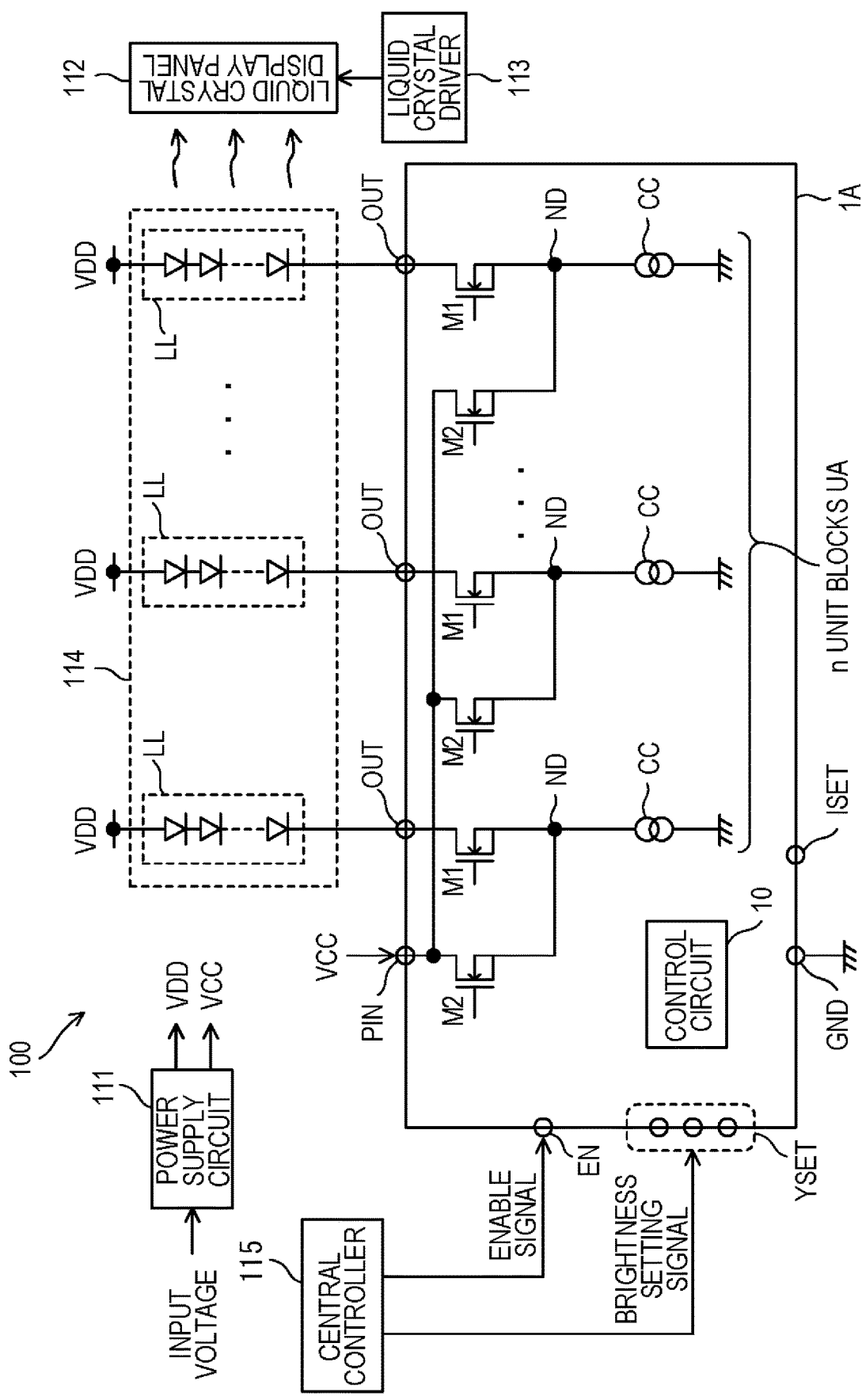
FIG. 12 is an outline circuit diagram of a liquid crystal display device according to the sixth practical example belonging to an embodiment of the present invention.

FIG. 12 is an outline circuit configuration diagram of the liquid crystal display device 100. The liquid crystal display device 100 includes a power supply circuit 111, a liquid crystal display panel 112, a liquid crystal driver 113, a backlight 114, a central controller 115, and an LED driver 1A.

The LED driver 1A is the LED driver 1 of the fourth practical example, and is here assumed to be provided with n unit blocks UA (see FIG. 9), where n is any integer equal to or larger than 2. All description given above in connection with the fourth practical example applies, with "LED driver 1" there read as "LED driver 1A" here, to the sixth practical example.

The power supply circuit 111 performs predetermined power conversion on an input voltage supplied to the liquid crystal display device 100, and thereby generates a plurality of voltages including the voltages VDD and VCC. The individual components in the liquid crystal display device 100 operate using, as driving voltages, the voltages generated by the power supply circuit 111. The input voltage may be an alternating-current voltage such as a commercial alternating-current voltage, or may be a direct-current voltage. The voltage VCC generated in the power supply circuit 111 is supplied to the voltage input terminal PIN of the LED driver 1A, and the voltage VDD generated in the power supply circuit 111 is supplied to the individual light-emitting portions LL in the manner described in connection with the basic practical example.

The liquid crystal display panel 112 has a plurality of pixels arrayed in a matrix. The liquid crystal display panel 112 is provided with a plurality of data lines and a plurality of scanning lines, and has the pixels arranged respectively at the intersections between the data lines and the scanning lines.

The liquid crystal driver 113 is fed with image data representing an image to be displayed on the liquid crystal display panel 112, and applies a voltage based on the image data to the liquid crystal display panel 112, thereby to make the liquid crystal display panel 112 form an image based on the image data. The liquid crystal driver 113 includes a data driver that applies driving voltages in accordance with the image data to the plurality of data lines and a gate driver that selects the plurality of scanning lines one after the next.

The backlight 114 includes n light-emitting portions LL, and functions as a light source for the liquid crystal display panel 112. Using the light emitted from those light-emitting portions LL, the liquid crystal display panel 112 displays the above-mentioned image so that it is visually recognizable.

The central controller 115 comprises an arithmetic processing device or the like, and controls the operation of different blocks in the liquid crystal display device 100 in a centralized fashion. The central controller 115 also functions as the external circuit 2 shown in FIG. 1, and feeds an enable signal and a brightness setting signal to the enable terminal EN and the brightness setting terminal YSET, respectively, of the LED driver 1A.

The casing of the LED driver 1A may be further provided with a terminal for receiving a vertical synchronizing signal and a terminal for receiving a horizontal synchronizing signal, and the control circuit 10 in the LED driver 1A may set the length of each unit period and the on-period of the main transistor M1 (that is, the main on-period $T_{ON1}$) in each unit period using the vertical and horizontal synchronizing signals.

Figure 13:
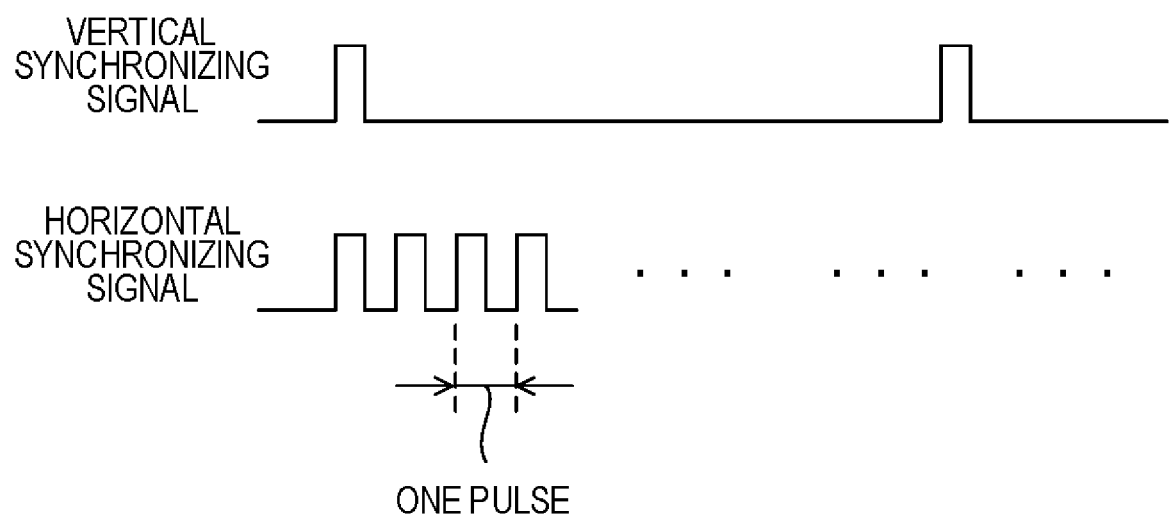
FIG. 13 is a diagram showing a vertical and a horizontal synchronizing signal according to the sixth practical example belonging to an embodiment of the present invention.

As shown in FIG. 13, the vertical synchronizing signal is a synchronizing signal with a frequency (for example, 200 Hz) corresponding to the reciprocal of the frame rate of the moving image displayed on the liquid crystal display panel 112. The horizontal synchronizing signal is a synchronizing signal including pulses corresponding to the number of horizontal lines on the liquid crystal display panel 112 within one cycle of the vertical synchronizing signal. In the horizontal synchronizing signal, the pulses corresponding to the number of horizontal lines are equally spaced. The liquid crystal driver 113 applies voltages based on image data to the liquid crystal display panel 112 with timing based on the vertical and horizontal synchronizing signals. The control circuit 10 of the LED driver 1A may be configured to set the main on-period $T_{ON1}$, for example, in units of time intervals each corresponding to one pulse in the horizontal synchronizing signal.

The liquid crystal display device 100 may be provided with a plurality of groups each comprising an LED driver 1A and n light-emitting portions so that the respective light-emitting portions of the plurality of groups together constitute the backlight 114.

When the backlight 114 is used as a backlight for the liquid crystal display panel 112, the backlight may be of a direct-lit type, or may be of an edge-lit type. The backlight may be configured to be compatible with backlight scanning. By driving the backlight 114 using the LED driver 1A, which boasts high output current, high withstand voltage, and fast response, it is possible to obtain an increased dynamic range in brightness adjustment, and to achieve enhanced gradation on the liquid crystal display panel 112.

Seventh Practical Example

A seventh practical example will now be described.

As described above, the transistors M1 and M2 are incorporated in a single electronic component that is an LED driver. Instead, while the constant current circuit CC and the control circuit 10 are formed in a semiconductor integrated circuit, apart from this, the transistors M1 and M2 may be provided as components externally fitted to the semiconductor integrated circuit. Or, while the constant current circuit CC, the control circuit 10, and the sub transistor M2 are formed in a semiconductor integrated circuit, apart from this, the main transistor M1 may be provided as a component externally fitted to the semiconductor integrated circuit. Or, while the constant current circuit CC, the control circuit 10, and the main transistor M1 are formed in a semiconductor integrated circuit, apart from this, the sub transistor M2 may be provided as a component externally fitted to the semiconductor integrated circuit.

In the practical examples described above, as a main and a sub switching element, that is, as the transistors M1 and M2, MOSFETs are used. Instead, bipolar transistors may be used to form the main and sub switching elements, or any other switching elements (thyristors, relays, or the like) that are not classified into transistors may be used to form the main and sub switching elements.

As described above, the light-emitting portion LL comprises one or more light-emitting elements that emit light by being supplied with electric current. The LEDs as light-emitting elements may be light-emitting diodes of any type, or may be organic LEDs that produce organic EL (organic electroluminescence). The light-emitting elements may be any other devices that are not classified into LEDs, and may be, for example, laser diodes.

Light-emitting element driving devices implemented as LED drivers according to the embodiment described herein are not limited for use in backlights for liquid crystal display panels, and find a variety of applications such as in LIDAR (laser imaging detection and ranging) using laser diodes, and in head-up displays; they are particularly suitable for applications where high output current and fast response are required or where high output current, high withstand voltage, and fast response are required.

Any embodiment of the present invention allows for many variations and modifications within the spirit and scope of the technical concepts recited in the appended claims. Any embodiment described herein merely presents an example of how the present invention can be implemented, and the senses of the terms used to describe the present invention and its features are not limited to those in which the terms are used in the description of any embodiment. Any specific values mentioned in the above description are merely examples, and, needless to say, can be modified to many different values.

What is claimed is:

1. A light-emitting element driving device comprising:
   a constant current circuit configured to supply a constant current to a light-emitting portion comprising one or more light-emitting elements that emit light by being supplied with electric current; and
   a main switching element inserted in series between the light-emitting portion and the constant current circuit,
   the light-emitting element driving device driving the main switching element with pulses, thereby to make the light-emitting portion emit light in pulses,
   wherein the light-emitting element driving device further comprises:
   a circuit configured to pass the constant current in the constant current circuit provided in series with the main switching element before said main switching element is turned on.

2. The light-emitting element driving device according to claim 1, further comprising:
   a sub switching element connected to a node between the main switching element and the constant current circuit; and
   a control circuit configured to control the main switching element and the sub switching element,
   wherein
   the control circuit turns on the sub switching element before turning on the main switching element, thereby to pass the constant current in the constant current circuit via the sub switching element, and
   the control circuit turns off the sub switching element when turning on the main switching element.

3. The light-emitting element driving device according to claim 2, wherein
   the control circuit drives the main switching element with cyclic pulses, and controls an on-period of the main switching element in each cycle, thereby to control light emission brightness of the light-emitting portion, and in each cycle, control circuit
   turns on the sub switching element before turning on the main switching element, thereby to pass the constant current in the constant current circuit via the sub switching element,
   turns off the sub switching element when turning on the main switching element, and
   turns off the main switching element on expiry of the on-period thereafter.

4. The light-emitting element driving device according to claim 3, further comprising:
   an enable terminal for receiving an enable signal,
   wherein operation of the constant current circuit can be stopped based on the enable signal during a whole or part of a period after the main switching element is turned off in one cycle before a next cycle starts.

5. The light-emitting element driving device according to claim 3, further comprising:
   a setting terminal for receiving a setting signal,
   wherein the control circuit sets the on-period based on the setting signal.

6. The light-emitting element driving device according to claim 2, comprising a plurality of blocks each comprising the constant current circuit, the main switching element, and the sub switching element.

7. The light-emitting element driving device according to claim 2, comprising a plurality of blocks each comprising the constant current circuit and the main switching element, wherein
   the main switching element can be driven with pulses for each block so that the light-emitting portion corresponding to the block emits light in pulses,
   the node in each block is together connected to the sub switching element, and
   the sub switching element is shared among the plurality of blocks as an element for passing the constant current in the constant current circuit before the main switching element is turned on in each block.

8. The light-emitting element driving device according to claim 1,
   the light-emitting portion comprises one or more light-emitting diodes.

9. A semiconductor device constituting the light-emitting element driving device according to claim 1, wherein
   the light-emitting element driving device is configured as an integrated circuit.

10. A light-emitting device comprising:
    a light-emitting portion; and
    the light-emitting element driving device according to claim 1 making the light-emitting portion emit light in pulses.

11. A liquid crystal display device comprising:
    a liquid crystal display panel; and
    the light-emitting device according to claim 10 as a light source for the liquid crystal display panel.

* * * * *